United States Patent [19]
Cheng

[11] Patent Number: 5,876,278
[45] Date of Patent: Mar. 2, 1999

[54] COOLING DEVICE

[76] Inventor: Henry Cheng, No. 5, Lane 121, Lung-Hsiao St., Gueishan Hsiang, Taoyuan Hsien, Taiwan

[21] Appl. No.: 864,960

[22] Filed: May 29, 1997

[51] Int. Cl.⁶ .................................................. H05K 7/20
[52] U.S. Cl. ........................................... 454/184; 361/695
[58] Field of Search ............................ 454/184; 361/691, 361/695; 55/385.4, 467, 471, 473

[56] References Cited

U.S. PATENT DOCUMENTS

| 4,931,904 | 6/1990 | Uiu ........................................... 361/695 |
| 5,079,438 | 1/1992 | Heung ................................... 261/695 X |
| 5,210,680 | 5/1993 | Scheibler ................................. 361/695 |
| 5,409,419 | 4/1995 | Euchner et al. ......................... 454/184 |
| 5,540,548 | 7/1996 | Eberhardt et al. .................... 454/184 X |
| 5,673,029 | 9/1997 | Behl et al. ........................... 454/184 X |

FOREIGN PATENT DOCUMENTS

| 0 292 671 | 11/1988 | European Pat. Off. ............... 361/695 |
| 2 235 564 | 1/1974 | Germany ................................. 454/184 |
| 3-270198 | 12/1991 | Japan ....................................... 361/695 |

*Primary Examiner*—Harold Joyce
*Attorney, Agent, or Firm*—Michael D. Bednarek; Kilpatrick Stockton LLP

[57] ABSTRACT

A cooling device is provided for cooling at least one computer component device in a main frame. The cooling device comprises a case and at least one fan assembly. The case is mounted adjacent to the computer component device, and is provided with at least one first opening communicating with air outside the main frame and at least one second opening facing the computer component device. The fan assembly is mounted in the case to suck the air outside the main frame through the first opening and directly ventilate the computer component device through the second opening.

17 Claims, 6 Drawing Sheets

COOLING DEVICE

BACKGROUND OF THE INVENTION

1. Field of the Invention

The present invention in general relates to a cooling device for dissipating heat generated by computer component devices in a main frame.

2. Description of Prior Art

As shown in FIG. 1, the main frame of a conventional computer has a cooling fan mounted on its back to discharge hot air, thereby lowering the temperature inside.

The CPU in the main frame easily generates a large quantity of heat and is further cooled by another cooling fan mounted thereon to help ensure stable CPU operation. However, the other component devices such as hard disk drives and CD ROM drives in the main frame are provided with no special cooling fans and therefore cannot be efficiently cooled. High temperature may cause them to become unstable or even fail. This problem has not received attention.

SUMMARY OF THE INVENTION

An object of the present invention is to provide a cooling device for solving the above-mentioned problem.

In accordance with the object of the present invention, there is provided a cooling device for cooling at least one computer component device in a main frame. The cooling device comprises a case and at least one fan assembly. The case is mounted adjacent to the computer component device, and is provided with at least one first opening communicating with air outside the main frame and at least one second opening facing the computer component device. The fan assembly is mounted in the case to suck the air outside the main frame through the first opening and directly ventilate the computer component device through the second opening. The case can be further provided with at least one third opening. The air outside the main frame can be thus sucked by the fan assembly through the first and third openings into the main frame to lower a temperture inside the the main frame.

Alternatively, the cooling device according to this invention comprises a case and at least one fan assembly. The case is mounted adjacent to the computer component device, and is provided with at least one first opening communicating with the outside of the main frame and at least one second opening facing the computer component device. The fan assembly is mounted in the case in order to discharge air in the main frame, through the second opening and the first opening, to the outside of the main frame and thereby ventilate the computer component device. The case can be further provided with at least one third opening. The air in the main frame can be thus discharged by the fan assembly through the third and first openings outside the main frame to lower a temperture inside the the main frame.

If more than one fan assembly, for example, two, are mounted in the case, then they can operate in two opposite directions to ventilate two computer component devices which are disposed above and below the cooling device of this invention.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
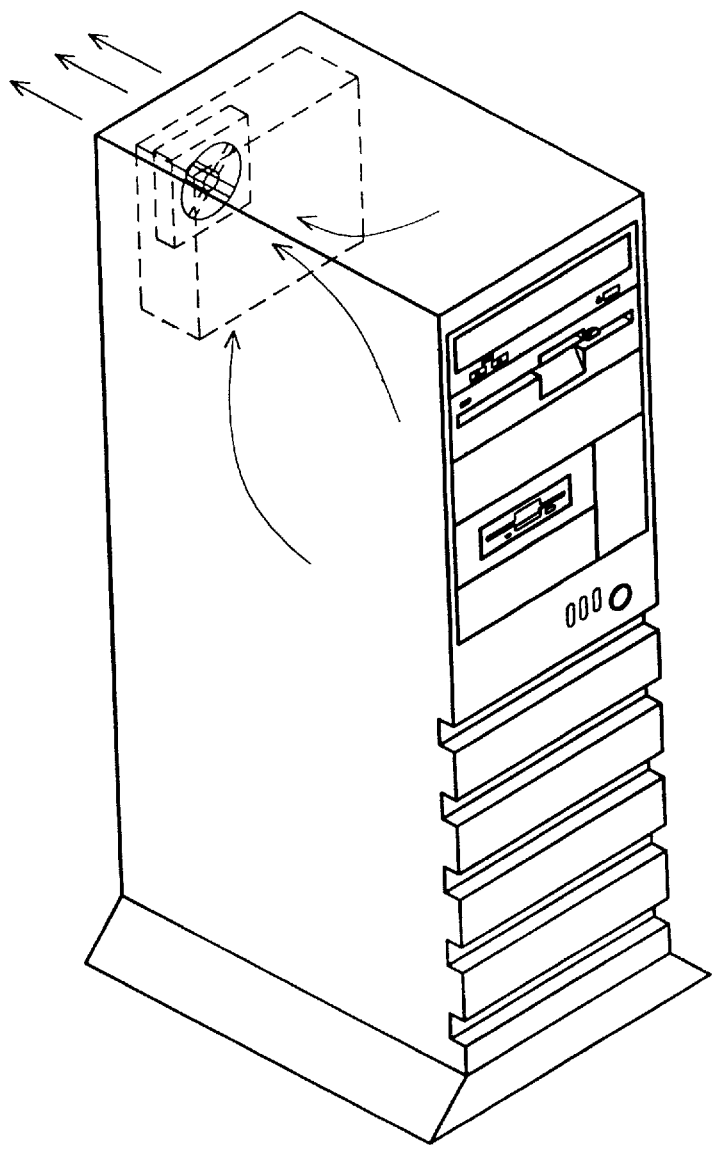
FIG. 1 is a perspective diagram of a main frame of a conventional computer.
Figure 2:
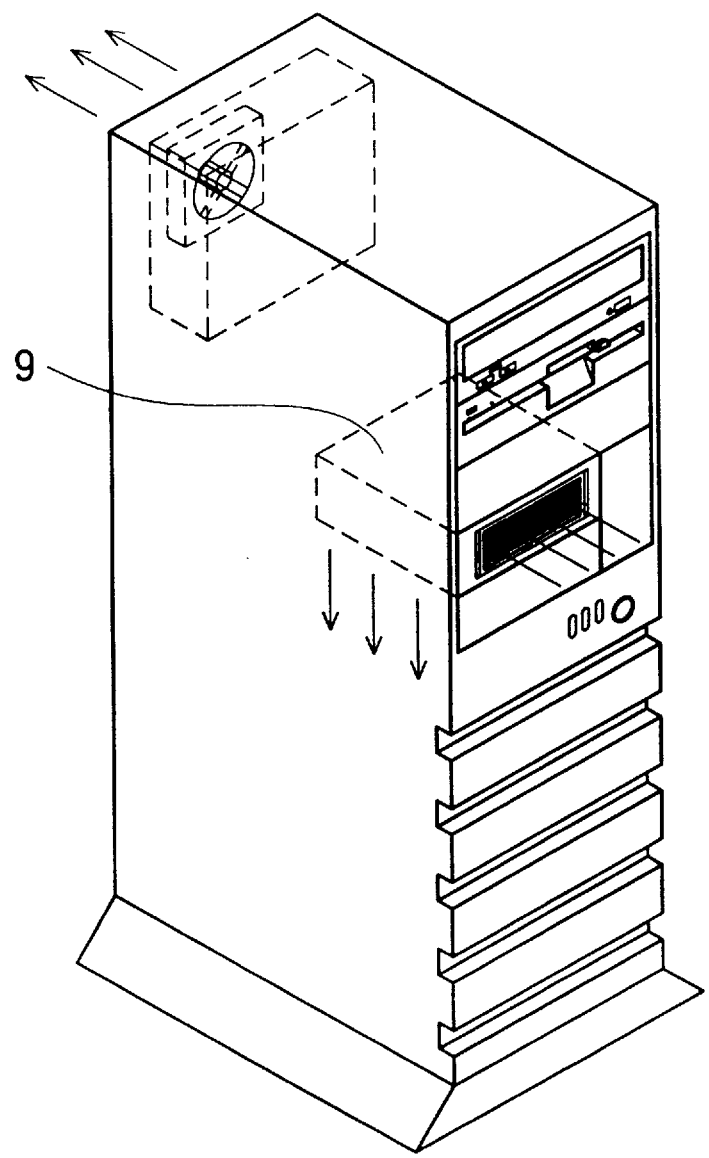
FIG. 2 shows a cooling device according to this invention that is mounted in a main frame of a personal computer.

As shown in FIG. 2, a cooling device 9 according to this invention is mounted in the main frame, near a computer component device which needs to be especially cooled. For example, the cooling device 9 is mounted above a hard disk drive and sucks outside air into the main frame to directly ventilate the hard disk drive.

Figure 3:
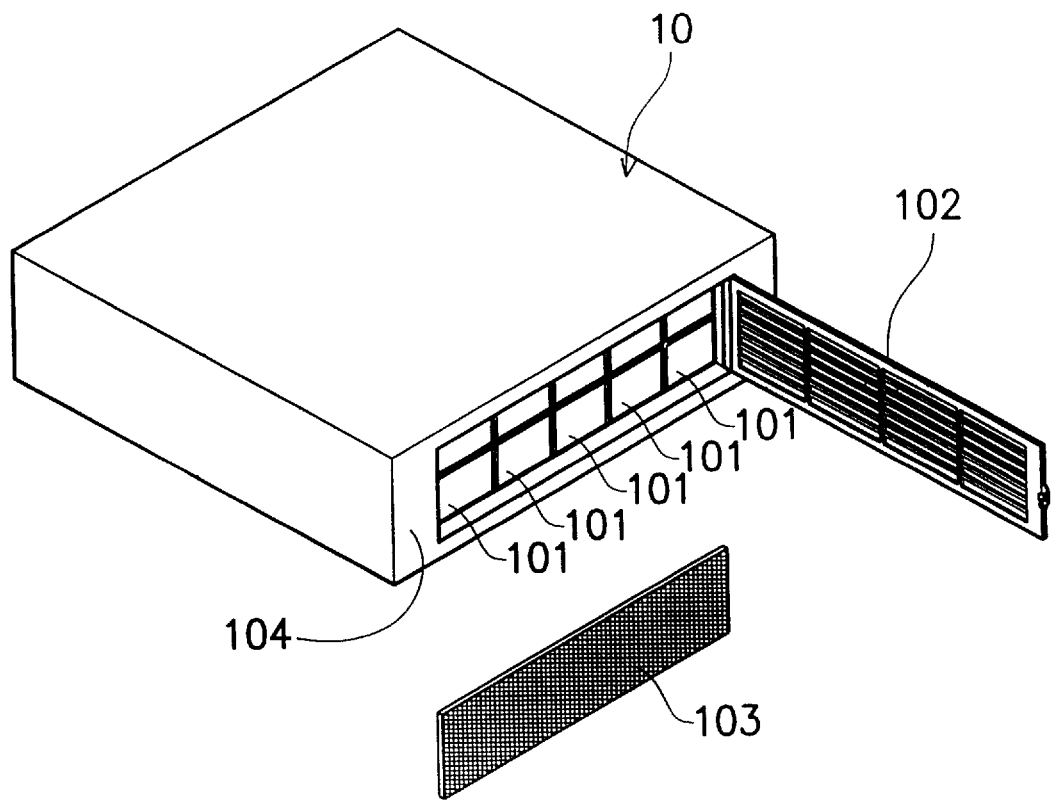
FIG. 3 is a schematic diagram of a case of the cooling device according to this invention.
Figure 4:
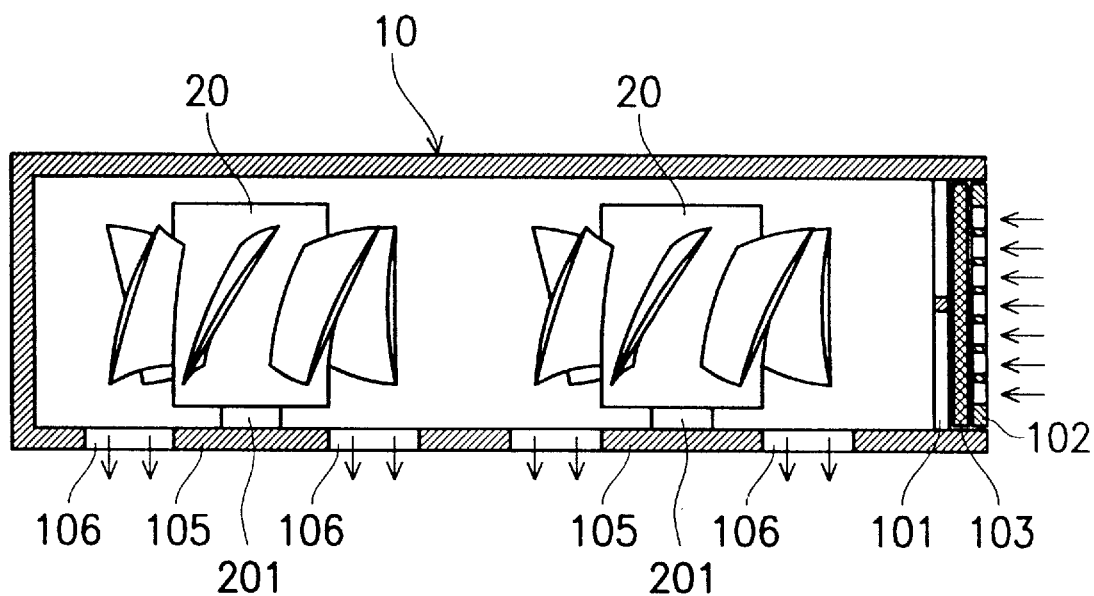
FIG. 4 is a sectional view of the cooling device according to a first embodiment of this invention.
Figure 5:
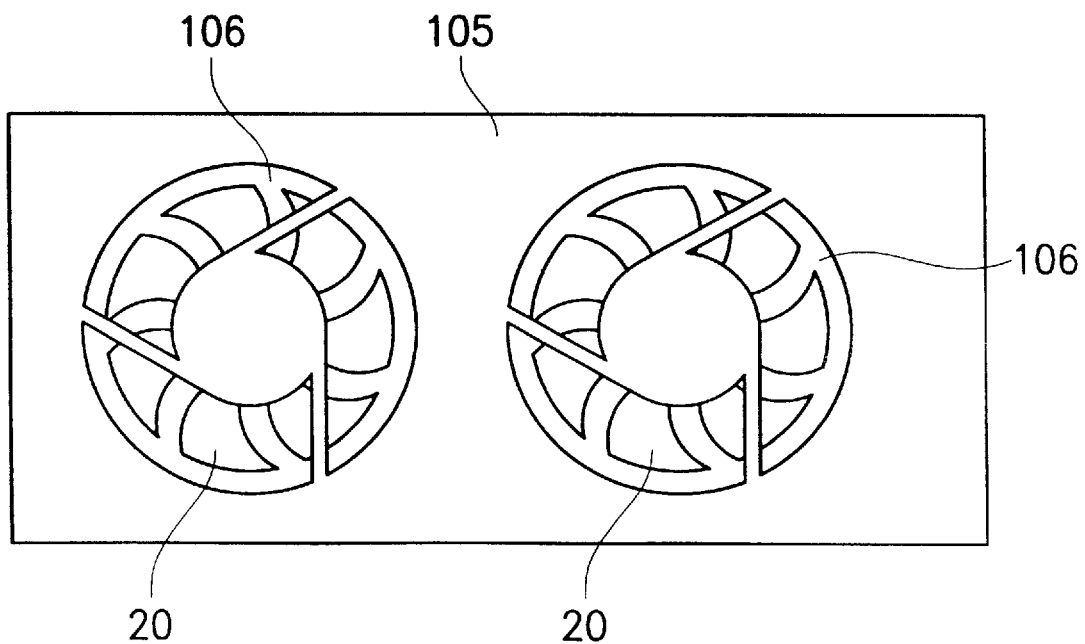
FIG. 5 is a bottom view of FIG. 4.

Referring to FIGS. 3 and 4, the cooling device 9 according to a first embodiment of this invention has a case 10 with two fan assemblies 20 mounted inside. The case 10 consists of a top plate, a bottom plate and four side plates. A plurality of first openings 101 are provided on one of side plates which is given a reference number 104, for allowing outside air to enter the case 10. A mesh grating 102 is mounted on the side plate 104 of the case 10 while a filter layer 103 is disposed between the mesh grating 102 and the side plate 104. As shown in FIGS. 4 and 5, the fan assemblies 20 are mounted on the bottom plate 105 of the case 10 via their shafts 201. A plurality of second openings 106 are provided on the bottom plate 105 of the case 10 under each fan assembly 20. Each fan assembly includes a blade rotatably mounted on a shaft.

When the fan assemblies 20 operate, outside air is sucked through the mesh grating 102, the filter layer 103 and the first openings 101 into the case 10, and is discharged from the second openings 106 under the fan assemblies 20 to directly ventilate a computer component device such as a hard disk drive in the main frame. The filter layer 103 can prevent dust contained in outside air from entering the main frame.

Figure 6:
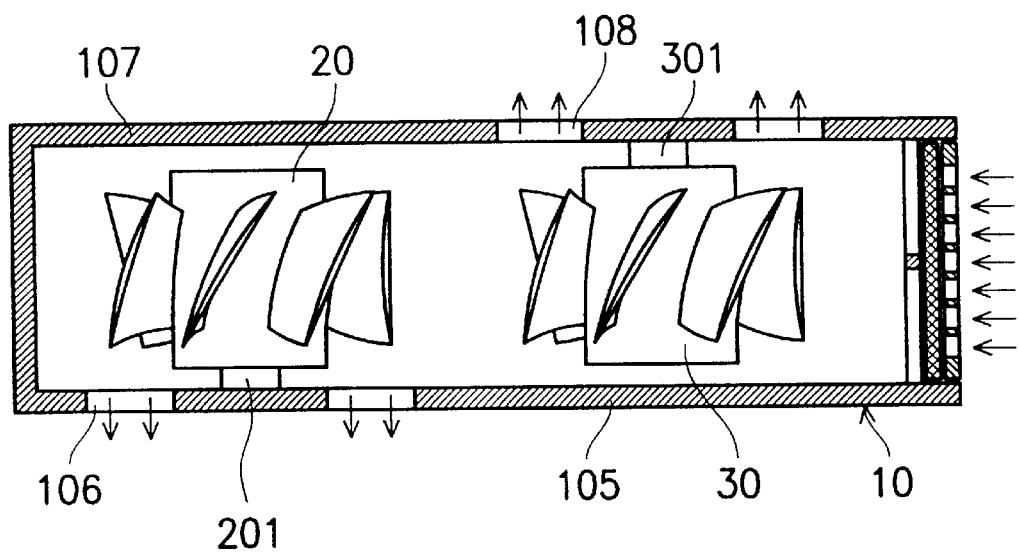
FIG. 6 is a sectional view of the cooling device according to a second embodiment of this invention.

FIG. 6 shows a second embodiment of this invention, in which most components are the same as those in the first embodiment, and are therefore indicated with the same reference numbers to omit their descriptions. A fan assembly 30 is mounted on the top plate 107 of the case 10 via its shaft 301, while the other fan assembly 20 is mounted on the bottom plate 105 via its shaft 201. A plurality of second openings 108 are provided on the top plate 107, over the fan assembly 30. When the fan assemblies 20, 30 operate, outside air is sucked into the case and is divided into two parts; one flows upward and the other flows downward. Therefore, the cooling device of the second embodiment can ventilate two computer component devices disposed above as well as below.

Figure 7:
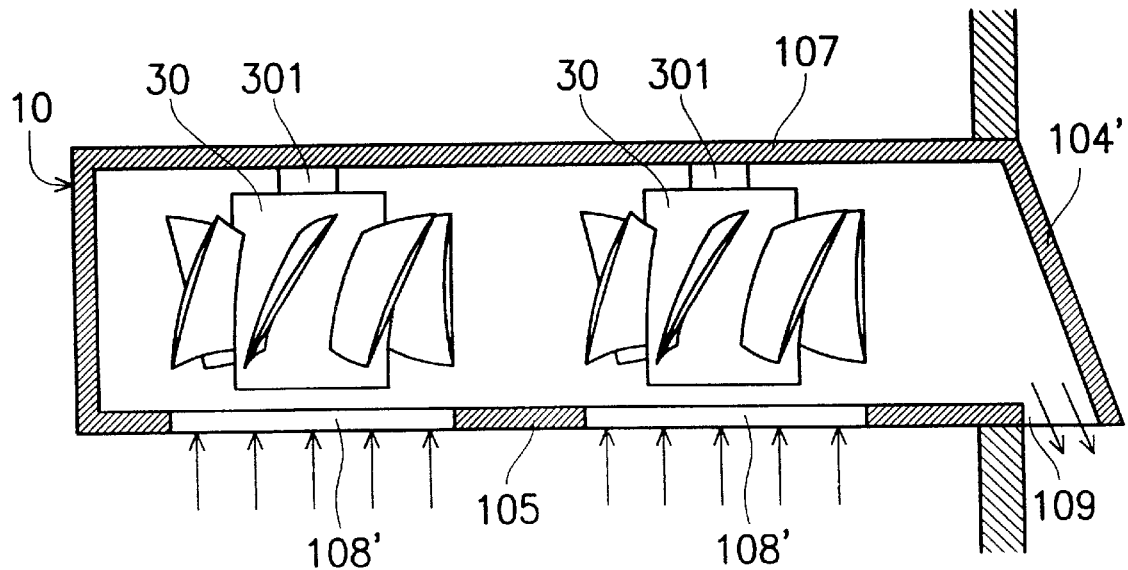
FIG. 7 is a sectional view of the cooling device according to a third embodiment of this invention.

FIG. 7 shows a third embodiment of this invention, in which some components are the same as those in the second embodiment, and are therefore indicated with the same reference numbers to omit their descriptions. Two fan assemblies 30 are mounted on the top plate 107 via their shaft 301, while two second openings 108' are provided on the bottom plate 105, under the fan assemblies 30 The two fan assemblies 30 can operate to discharge air in the main frame out. By this arrangement, computer component devices mounted in the main frame can be also efficiently ventilated. It is noted that a side plate 104' of the case 10 is tilted to form an air outlet 109 between the bottom plate 105 and the side plate 104'. The air is discharged through the air outlet 109 and flows downward and does not directly blow at the computer user.

Figure 8:
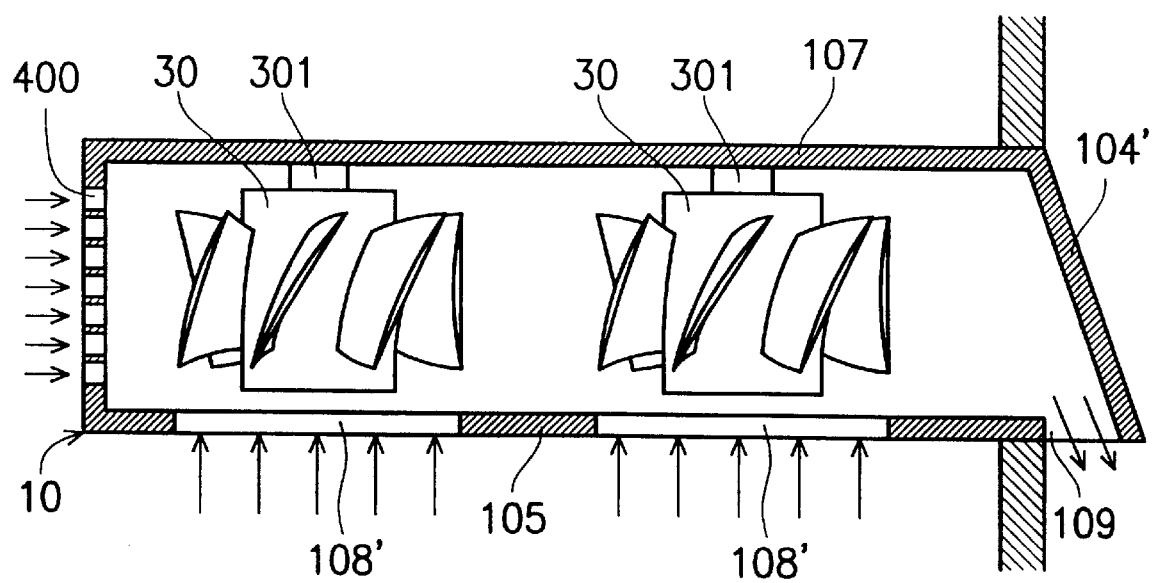
FIG. 8 is a perspective view of the cooling device according to a modification of this invention.

The cooling device of this invention can work more efficiently if the case is further modified. As shown in FIG. 8, a plurality of third openings 400 are provided on a side plate of the case 10. When the fan assemblies 30 operate, computer component devices provided beside the case 10 can be directly ventilated, as mentioned above. In the meantime hot air in the main frame is discharged through the third openings 400 and the air outlet 109 to the outside Therefore, the modification to the case can also lower the temperature inside the main frame.

Although this invention has been described in its preferred forms and various examples with a certain degree of particularity, it is understood that the present disclosure of the preferred forms and the various examples can be changed in the details of construction. Accordingly, the scope of the invention should be determined by the appended claims and not by the specific examples given herein.

What is claimed is:

1. A cooling device for use in a computer that has a casing having an interior and an exterior and a plurality of computer component devices located within the interior of the computer casing, the cooling device being supported on the computer casing and extending into the interior of the casing so as to allow cooling of at least one of the computer component devices that are located within the interior of the computer casing, the cooling device comprising:

a single fan case having an interior and an exterior, the fan case being supported on the computer casing and extending into the interior of the computer casing at a location proximate the at least one computer component device to be cooled, the fan case having at least a first vent portion allowing air flow between the interior of the fan casing and the interior of the computer casing and a second vent portion allowing air flow between the interior of the fan casing and the exterior of the computer casing;

a plurality of fan units located within the single fan case, each of the fan units comprising a shaft supported directly on the fan case and a blade assembly that is rotatable about the shaft, each of the blade assemblies being supported within the casing such that there is nothing between the blade assembly and at least one of the vent portions of the fan case.

2. The cooling device of claim 1, wherein the fan casing comprises a top plate, a bottom plate and four side plates so that the fan case defines a substantially enclosed interior space so that air flowing through the fan case is caused to flow through the vent portions.

3. The cooling device of claim 1, wherein the fan casing comprises at least six planar walls including a top wall, a bottom wall and four side walls, each of the walls having an interior surface and an exterior surface and the walls being connected to one another so as to define a substantially closed space having an interior and exterior and wherein all the interior walls face the interior of the enclosed space and the blade assemblies being supported within the enclosed space such that there is nothing between the blade assembly and at least one of the vent portions of the fan case.

4. The cooling device of claim 1, wherein at least one of the walls of the fan case being located entirely within the interior of the computer casing and at least one other of the walls of the cooling device located outside of the computer casing.

5. The cooling device of claim 1, wherein at least one of the walls of the cooling device having an entirely unobstructed exposure to the exterior of the computer case.

6. The cooling device of claim 3, wherein each of the shaft components of the fans are mounted directly to the interior surface of a side wall that extends into the interior computer at a location located within the interior of the computer.

7. The cooling device of claim 1, wherein the fan casing comprises at least six planar walls including a top wall, a bottom wall that is substantially parallel to the top wall and four side walls that extend between the top wall and the bottom wall, each of the walls having an interior surface and an exterior surface and the walls being connected to one another so as to define a substantially closed space having an interior and exterior and wherein all the interior walls face the interior of the enclosed space and wherein the first vent portion is located on one of the top wall and the bottom wall and the second vent portion is located on one of the side walls so that the first and second vent portions are substantially orthogonally arranged with respect to one another.

8. The cooling device of claim 1, wherein two fan units are mounted in the fan case to ventilate two distinct computer component devices in two opposite directions.

9. A cooling device for use in a computer that has a casing having an interior and an exterior and a plurality of computer component devices located within the interior of the computer casing, the cooling device being supported on the computer casing and extending into the interior of the casing so as to allow cooling of at least one of the computer component devices that are located within the interior of the computer casing the computer, the cooling device comprising:

a single fan case having an interior and an exterior, the fan case being supported on the computer casing and extending into the interior of the computer casing at a location proximate the at least one computer component device to be cooled, the fan case having a plurality of walls that collectively define an enclosed space having an interior and an exterior and at least a first vent portion allowing air flow between the interior of the fan casing and the interior of the computer casing and a second vent portion allowing air flow between the interior of the fan casing and the exterior of the computer casing;

a plurality of fan units located within the interior of the fan case, each of the fan units comprising a shaft component mounted directly to one of the walls of the fan case and a blade component rotatably supported on the shaft component.

10. The cooling device of claim 9, wherein the fan case comprises at least six distinct walls defining a closed case interior; wherein at least five of the side walls of the cooling device extend substantially entirely into the computer casing.

11. The cooling device of claim 9, wherein all of the walls of the fan case are planar.

12. The cooling device of claim 9, wherein the fan casing comprises at least six planar walls including opposed top and bottom walls and four side walls extending between the opposed top and bottom walls, each of the walls having an interior surface and an exterior surface and the walls being connected to one another so as to define a substantially closed space having an interior and exterior and wherein all the interior walls face the interior of the enclosed space and a first one of the fan assemblies being mounted on and arranged so as to cause air to flow through the bottom plate and a second one of the fan assemblies being mounted on and arranged so as to cause air to flow through the top plate.

13. The cooling device of claim 9, further comprising a mesh grating mounted on one of the walls of the fan case and a filter layer disposed between the mesh grating and the side plate.

14. The cooling device of claim 9, wherein two fan units are mounted in the fan case to ventilate two distinct computer component devices in two opposite directions.

15. A cooling device for use in a computer that has a casing having an interior and an exterior and a plurality of computer component devices located within the interior of the computer casing, the cooling device being supported on the computer casing and extending into the interior of the casing so as to allow cooling of at least one of the computer component devices that are located within the interior of the computer casing the computer, the cooling device comprising:

a single fan case having an interior and an exterior, the fan case being supported on the computer casing and extending into the interior of the computer casing at a location proximate the at least one computer component device to be cooled, the fan case further comprising at least one vent providing direct communication between the interior of the fan case and the interior of the computer casing and a second vent providing direct communication between the interior of the fan case and the exterior of the computer casing a plurality of fan units located within the interior of the fan case, and wherein said fan units are adapted to cause air flow from the interior of the computer casing to the exterior of the computer through the fan case, wherein each of the fan units comprising a shaft component mounted directly to one of the walls of the fan case and a blade component rotatably supported on the shaft component.

16. The cooling device of claim 15, wherein the fan case includes six planar side walls each having an inner surface and an outer surface, all inner surfaces facing the interior and all external surfaces facing the exterior; wherein the computer components to be cooled are located within the computer device but not within the interior of the fan case and wherein the fan is located within the interior of the fan case; wherein the fans are located between two opposed planar walls each of the two opposed planar walls including a vent so that air can flow out of the interior of the cooling device through the passages in both of the opposed side walls.

17. The cooling device of claim 15, wherein two fan units are mounted in the fan case to ventilate two distinct computer component devices in two opposite directions.

\* \* \* \* \*